US011934359B1

(12) United States Patent
Sun et al.

(10) Patent No.: US 11,934,359 B1
(45) Date of Patent: Mar. 19, 2024

(54) LOG CONTENT MODELING

(71) Applicant: INTERNATIONAL BUSINESS MACHINES CORPORATION, Armonk, NY (US)

(72) Inventors: Sheng Yan Sun, Beijing (CN); Peng Hui Jiang, Beijing (CN); Meng Wan, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 18/056,729

(22) Filed: Nov. 18, 2022

(51) Int. Cl.
G06F 16/21 (2019.01)
(52) U.S. Cl.
CPC .................... G06F 16/21 (2019.01)
(58) Field of Classification Search
CPC ..... G06F 16/21; G06F 16/219; G06F 16/9017
See application file for complete search history.

(56) References Cited

U.S. PATENT DOCUMENTS

| 5,283,887 | A | 2/1994 | Zachery |
| 6,424,978 | B1 | 7/2002 | Liu |
| 8,577,754 | B1 * | 11/2013 | Chanda ................. G06Q 30/02 705/26.7 |
| 2005/0149861 | A1 | 7/2005 | Bishop |
| 2006/0064411 | A1 * | 3/2006 | Gross ................. G06F 16/9535 |
| 2022/0092453 | A1 | 3/2022 | Herger |

FOREIGN PATENT DOCUMENTS

| EP | 0925542 B1 | 8/2002 |
| WO | 2007103938 A2 | 9/2007 |

OTHER PUBLICATIONS

Disclosed Anonymously, "System for Proactively Setting Levels of Log Detail Based on Predicted Problems and to Increase the Trust Around Models," IP.com, IP.com No. IPCOM000269912D IP.com Publication Date: May 23, 2022, 6 pages.
Dumas et al., "Business Process Event Logs and Visualization," In: Sakr et al. (eds) Encyclopedia of Big Data Technologies. Springer, Published: Feb. 20, 2019, pp. 398-409, https://doi.org/10.1007/978-3-319-77525-8_86, 20 pages.
(Continued)

Primary Examiner — Loc Tran
(74) Attorney, Agent, or Firm — Lily Neff

(57) ABSTRACT

A method, computer system, and a computer program product is provided for computer log management. In one embodiment, in response to receiving a log request from a user, an input content is analyzed and adjusted according to input contents and user's previous activities. A similarity analysis and a fairness analysis is performed to determine similarities between the input content, as adjusted, and a plurality of log records in an object library. The similarity analysis includes analyzing any patterns and attributes. The attributes have a dimension, and each dimension has a predefined weight (W). The fairness analysis ensures that one type of log is not favored over others. A best possible match is then determined, and one or more logs are presented to the user providing the best possible match.

20 Claims, 3 Drawing Sheets

(56) References Cited

OTHER PUBLICATIONS

Frece et al., "Modeling functional requirements for configurable content- and context-aware dynamic service selection in business process models," Elsevier, Journal of Visual Languages and Computing 23 (2012), Available online: Apr. 27, 2012, http://dx.doi.org/10.1016/j.jvlc.2012.02.003, pp. 223-247.

Li, "Automatic Log Analysis using Machine Learning—Awesome Automatic Log Analysis version 2.0 ," Uppsala Universitet, Nov. 2013, https://www.diva-portal.org/smash/get/diva2:667650/FULLTEXT01.pdf, 50 pages.

* cited by examiner

LOG CONTENT MODELING

BACKGROUND

The present invention relates generally to the field of digital data management, and more particularly to techniques for providing a log content presenting model.

A computer log may be one or more files that either record events that occur such as in an operating system or capture messages between different users of a communication software. Log files may provide a list of application information, system performance and other user activities taking place in a computing environment. Consequently, log files (hereinafter also referenced as logs) may be useful in a variety of ways. They may keep track of a computer usage, provide recovery during an emergency, and provide improvements in an application flow. Many log entries can also be used to provide usage statistics and improve overall efficiency. Log files may be divided into a variety of categories depending on the information they provide. For example, there may be error logs used for diagnostic purposes. application logs, and access logs and others depending on the information the files provide.

In recent years, the growth of many businesses and computer system providers had added to the complexity of how servers and the number of log files have grown exponentially. The growth of hybrid cloud environment has increased the number of these files and made the management of logs even more challenging. Consequently, log monitoring, collection, management, and analysis of logs have become a challenging design aspect of any decision-making system.

SUMMARY

Embodiments of the present invention disclose a method, computer system, and a computer program product for management of logs. In one embodiment, in response to receiving a log request from a user, an input content is analyzed and adjusted according to input contents and user's previous activities. A similarity analysis and a fairness analysis are performed to determine similarities between the input content, as adjusted, and a plurality of log records in an object library. The similarity analysis includes analyzing any patterns and attributes between the input content and the log records. The input content has attributes. The attributes in turn have a dimension, and each dimension has a predefined weight (W). The fairness analysis ensures that one type of log is not favored over others. Based on the results of the fairness and similarity analysis, a best possible match is then determined, and one or more logs are presented to the user providing the best possible match.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
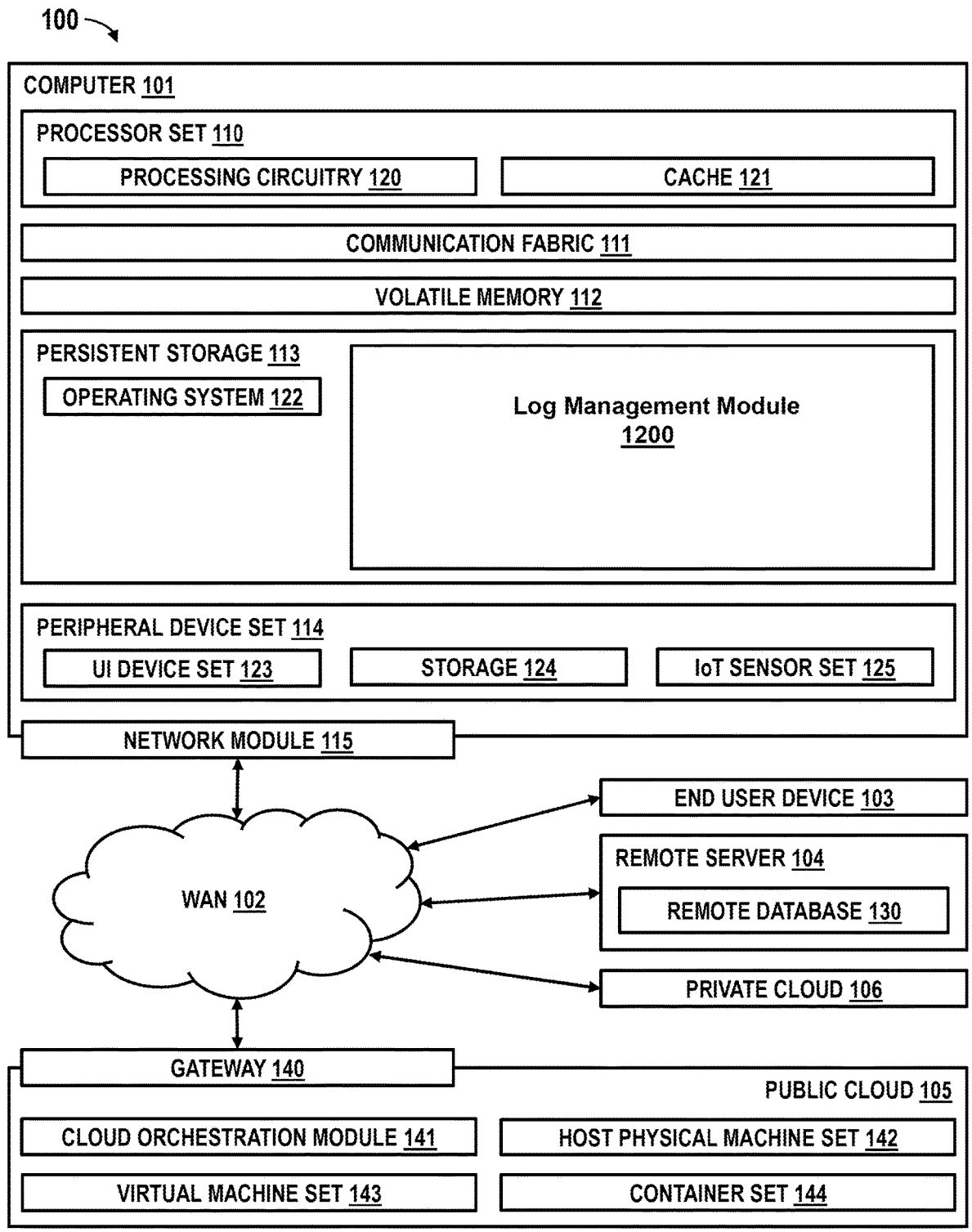
FIG. 1 illustrates a networked computer environment according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as code change differentiator which is capable of providing a log management module (1200). In addition to this block 1200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 1200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 1200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and rewriting of data. Some familiar forms of persistent storage include magnetic disks and solid state storage devices. Operating system 122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
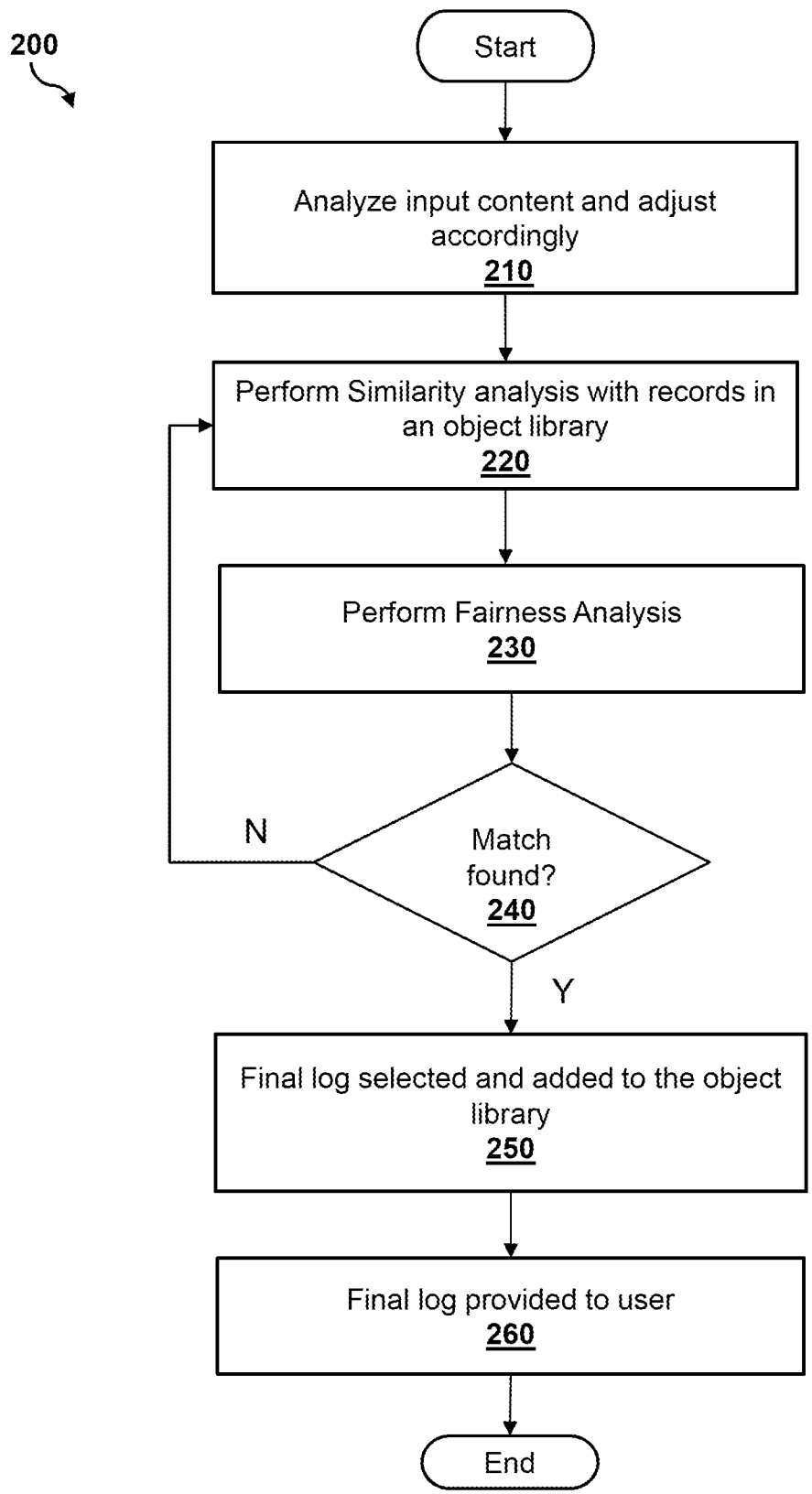
FIG. 2 provides an operational flowchart for a log management system according to one embodiment.

FIG. 2 provides a flowchart depiction of a process 200 that can analyze relevant logs and present them according to different needs or user requirements. These could be business needs or system needs such as providing information in a manner required for easy next stage processing. As will be discussed in conjunction with the figures, including FIG. 2, the content of the log will be more intelligently presented accordingly (for example chart, table, graphics, etc.). In one example, this may provide a more intuitively manner to present content that may be based on the context and/or user preferences, including industry, position, financial, diagnostic or others.

In Step 210, a log request may be received for a log including an input content. The log content is analyzed. If there is previous user history or preferences, the input content may be adjusted to provide usage context and connotation for the log request.

In one embodiment, a pattern analyzer semantically analyzes input content for any pattern relationship, such as using Natural Language Processing (NLP). In one embodiment a machine learning algorithm can be used such as by an Artificial Intelligence (AI) module. The process to analyze the pattern for the object library and the input content can include receiving a variety of input content sch as in the form of bar charts, tables, graphs, images and having information such as profile of the author (industry, organization, position etc.), profile of the reader (industry, organization, position etc.), object generation date, source of the object (conference, mail, journal etc.) and the like.

In one embodiment, if the classification of the object may be "text," then NLP may be used and certain criteria may be considered such as inclusion, relationships, coordinate relationship, sequence relationship, time relationships, nesting, etc. Alternatively, if the object may be non-text (code, error), pattern analyzer also classifies objects such as by machine learning classification or manual tag and the like.

In Step 220, an object library may be searched to determine if there may be a match between the input content and the records in the object library using the pattern analyzer. The object library may be a pool of data containing a large number of different objects, such as tables, flow charts, line charts, text, and so on. Each object may contain, but is not limited to including, attributes. These attributes may contain a profile of the author and the reader including an industry/organization/position, the generation date and the source of the object, and details.

The comparison analysis can be conducted similarly to the original analysis process. For example, attributes may be first compared including profiles, generation date and the source of the object. In addition, relationships (such as coordinate relationships, sequence relationships, time relationships, etc.) can be also compared as well as non-text (such as code, error etc.) criteria. When the object may be non-text (code, error), pattern analyzer also classifies it by (machine learning) classification or manual tag. Also, the attributes and pattern relationships can be used for similarity analysis between the record in the object library and the input content. Each object in the pool may be a record containing the attributes and the pattern relationship. Each attribute/pattern relationship may be a similarity analysis dimension.

In one embodiment, the pattern analyzer performs the similarity analysis by each dimension (DS, each attribute and pattern relationship) between the input and the records in the object library. In one embodiment, each dimension has a pre-defined weight (W), and the final similarity may be determined by the relationship:

$$\sum_{1}^{n}(DSi*Wi)$$

In Step 230, a fairness analysis may be conducted (using, among other things, a non-discrimination and fairness analysis) to remove any bias. Bias can be determined to be acceptable or unacceptable. Acceptable bias, also known as explainable bias, describes a situation where the discrepancy of outcomes for different individuals or groups can be reasonably explained by factors. Based on this fact, such biased outcomes are acceptable and reasonable.

Conversely, bias that cannot be explained appropriately may be treated as unacceptable bias, which should be avoided in practice. As a log management system requirement, the most common problem may be that there is a tendency to favor one type of log processing format over another, and therefore ignore the needs of other types. In one embodiment, the process can be divided in several stages to perform fairness analysis from a pre-processing to a post-processing stage. The model can then be determined to improve the sample (for example by choosing different type of models for different processing.)

In Step 240, it may be determined if there are any records found. If more than one record may be found, the one with the highest final similarity may be selected. In one embodiment a text oriented and a non-text oriented selection can be made. The target text can be used to apply the format and styles to the input content. A new non-text object can be generated by the target non-text object and inserted into the input content.

In Step 250, the final log may be selected. This indicates the best match object(s) which may be also added to the object library. This addition includes, in one embodiment, any applied formats and styles to the input content. In one embodiment, the application will be made after a user edits the new object(s). The new entry in the library can be used in subsequent searches.

In Step 260, according to one embodiment, the final log as selected will be presented to the user. As will be discussed later, this can be provided with some granularity and user previous usage so that relevant logs are presented according to different user's needs such as business requirements etc. in a more intuitive manner.

Figure 3:
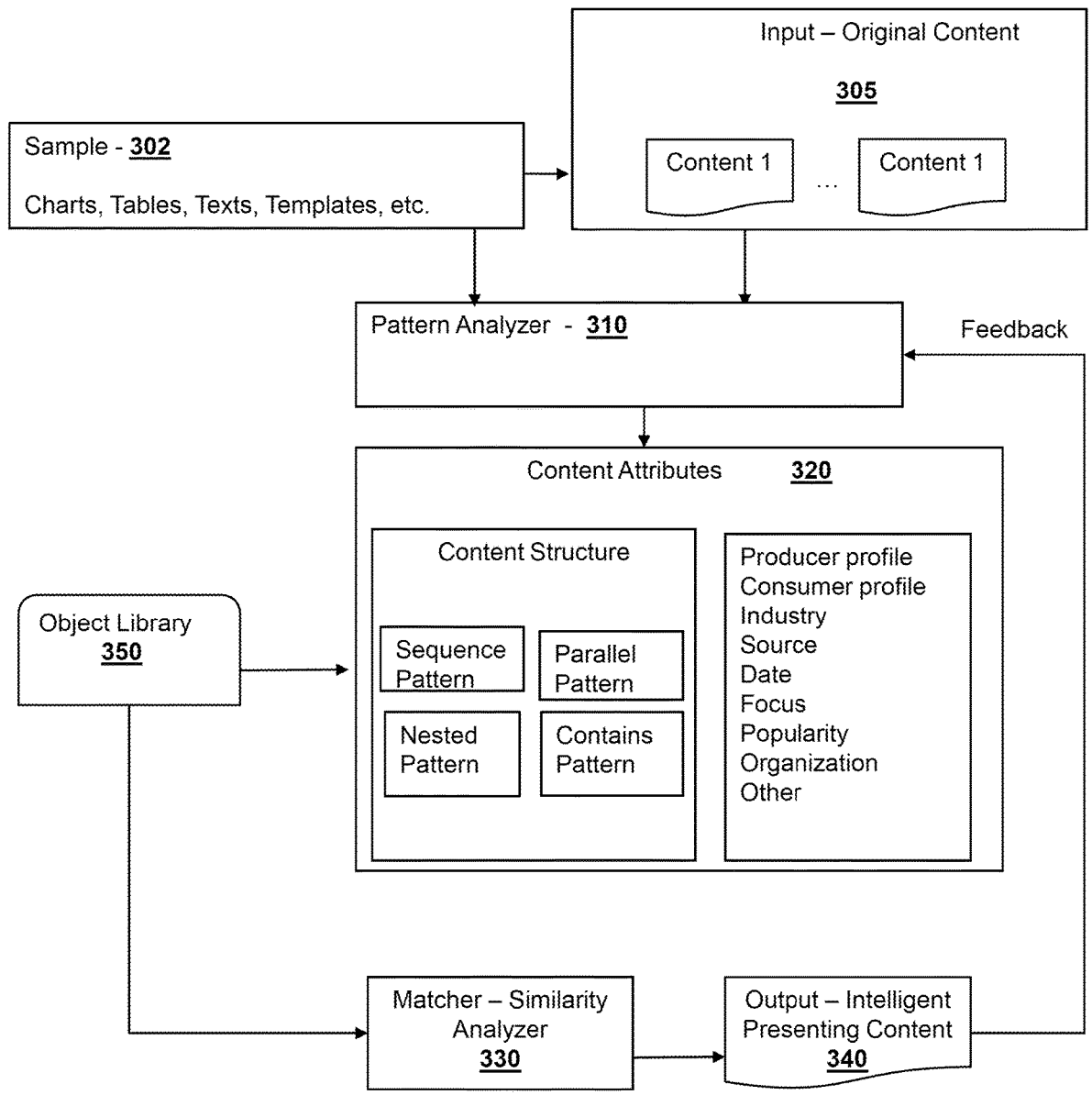
FIG. 3 provides a block diagram illustrating the flow of information as processed by the pattern analyzer according to an embodiment.

FIG. 3 provides a block diagram illustrating the flow of information as processed by the Pattern Analyzer 310. As shown a sample input 302 can first be provided to the Pattern Analyzer 310 for setting up the library or other analysis component so that input content 305 can be processed subsequently. The sample input 302 can contain charts, tables, texts, templates and the like. The input content 305 can have a plurality of contents. The content attributes can be categorized in a variety of bundle such as content structure that can include patterns and other attributes such as profiles, source and date and others, The Object Library 350 can also be assessed. Object Library 350 may also be in communication with a Matching Analyzer 330 that helps perform a similarity and fairness analysis. In one embodiment, the input content 305 has attributes which may include, but are not limited to including: profile of the productor and the user including system/application/organization/position, the generation date and the source of the content, and so on.

As was discussed in conjunction with FIG. 2, the Pattern Analyzer 310 can semantically analyze the pattern relationship (shown in 320), such as by NLP and machine learning classification, such as inclusion relationships, coordinate relationship, sequence relationship, time relationships, nesting, and so on. In addition, the Pattern Analyzer 310 performs the similarity analysis by each dimension (DS, each attribute and pattern relationship) between the input and the records in the object library to find the best match (as discussed, in one embodiment, each dimension has a pre-defined weight (W)).

Ultimately the matched items are processed by a Matcher (similarity analyzer 330 which communicates both with the Pattern Analyzer 320 (through content attributes module 320). As was discussed earlier, this can be achieved by having at least two records with the highest final similarity, if there is any, including one which may be text and one which may be non-text. The target text will then be used to apply the format and styles to the input content.

A final log may then be presented by the output in an intelligent presenting manner as provided at 340. In one embodiment, the user can provide further comments and reject or accept the final product. After the user finishes editing or accepting the log (new object(s)), the user's comments and/or rejection or acceptance of the final log will be used as feedback to refresh the Object Library 350. Through using feedback, a direct transformation can be made on a model's output to ensure fair final outcomes. For example, this can force the conditions to hold for different groups (of people etc.). In one embodiment, additional add-ons are not required so feedback can be generally used to correct the re-present.

An example can now be used in conjunction to provide ease of understanding. In this example, a scenario is presented where the content may be provided as input. The main presentable target is analyzed to determine the type. For ease of discussion, the types considered here for analysis were: Tabular, Image, Text Domain, Audio and Graph. It is quickly determined by the Pattern Analyzer 310 that there is no Image or Audio associated.

In this scenario, an Artificial Intelligence (AI) module/algorithm is being used and the machine learning approach is to use an adversarial framework with a generator to capture the data distribution and generate latent representations. The adversarial gaming framework is then used by the Content Attributes analysis (using the Object library 350) to learn the fair representations of the relevant individual components. To meet fairness constants, the fair representations are those that lose the information about the protected attributes while preserving as much of the other information of that individual as possible. It means for log data grouping and feature identification for different patterns, the patterns need to: a) contain little or no information about the protected attributes; and b) preserve as much information as possible except for the protected attribute. As a complement for each log input data and for adversarial learning, the training data is relabeled for further support.

In an alternate embodiment, the implicit bias of a deep text classification model may be seen by examining the overlapping between salient words for the main task and the words correlated with the log attribute. An obvious example may be "error," "debug," "logs" may influence the grouping and presenting model choice for impact consume experience.

In one embodiment, an attention mechanism can also be implemented especially for text pattern types of groupings, and a processing model can be generated to provide a corresponding relationship between log input and pattern output based on attention. For example, in a sample method, a Hierarchical Attention can be provided to structure 3 levels Attention Mechanisms:

Words→statements→paragraphs.

In this scenario, a whole network can be built with 6 parts:
A word sequence encoder BRNN
An attention layer about words-level
A statements sequence encoder BRNN
An attention layer about statements-level
A paragraphs sequence encoder BRNN
An attention layer about paragraphs-level In this example, the model can use attention over attention as an alternative method to figure out a matrix involving the words/statements/paragraphs arrangement.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for computer log management, comprising:
receiving a request form a user for retrieving a log record, said request having an input content;
determining any record of previous activity of the user and preferences and adjusting said input content based on a usage connotation determined by said previous activity of the user and preferences;
performing a similarity analysis of said adjusted input content and a plurality of log records in an object library, wherein said similarity analysis compares a plurality of attributes and patterns in said input content and said log records, and each attribute has a dimension with a predefined weight (W);
performing a fairness analysis when comparing said input content and said plurality of log records so as to ensure that one type of log is not to favored over another type of log; and
determining a final log selection and providing it to said user, wherein said final log is the result of a best match between said input content and at least one record in said plurality of log records in said object library based on one or more similarities determined during said similarity analysis and said fairness analysis.

2. The method of claim 1, wherein said final log selection is segmented according to a plurality of granularities relevant to said usage connotation.

3. The method of claim 1, wherein said final log selection is stored in said object library.

4. The method of claim 1, wherein said similarity and fairness analysis is based on either or both text oriented and non-text oriented objects provided in said input content and said log records in said object library.

5. The method of claim 1, wherein a pattern analyzer is used to semantically analyze a pattern relationship between said input content and said plurality of log records in said object library, wherein said pattern analyzer uses Natural language Processing (NLP) in its analysis.

6. The method of claim 1, wherein said input content includes at least one of a bar chart, a table, a graph, or a plurality of images.

7. The method of claim 1, wherein said input content includes at least one of an author profile, a reader profile, a generation data or source of an object.

8. The method of claim 1, wherein a plurality of relationships is determined during said pattern analysis including at least one of a coordinate relationship, a sequence relationship, and a time relationship.

9. A computer system for providing a log management, comprising:

one or more processors, one or more computer-readable memories, one or more non-transitory computer-readable storage medium, and program instructions stored on at least one of the one or more non-transitory computer-readable storage medium for execution by at least one of the one or more processors via at least one of the one or more computer-readable memories, wherein the computer system is enabled to perform the steps:

receiving a request from a user for retrieving a log record, said request having an input content;

determining any record of previous activity of the user and preferences and adjusting said input content based on a usage connotation determined by said previous activity of the user and preferences;

performing a similarity analysis of said adjusted input content and a plurality of log records in an object library, wherein said similarity analysis compares a plurality of attributes and patterns in said input content and said log records, and each attribute has a dimension with a predefined weight (W);

performing a fairness analysis when comparing said input content and said plurality of log records so as to ensure that one type of log is not to favored over another type of log; and determining a final log selection and providing it to said user, wherein said final log selection is the result of a best match between said input content and at least one record in said plurality of log records in said object library based on one or more similarities determined during said similarity analysis and said fairness analysis.

10. The computer system of claim 9, wherein said final log selection is segmented according to a plurality of granularities relevant to said usage connotation.

11. The computer system of claim 9, wherein said final log selection is stored in said object library.

12. The computer system of claim 9, wherein said similarity and fairness analysis is based on either or both text oriented and non-text oriented objects provided in said input content and said log records in said object library.

13. The computer system of claim 9, wherein a pattern analyzer is used to semantically analyze a pattern relationship between said input content and said plurality of log records in said object library, wherein said pattern analyzer uses Natural language Processing (NLP) in its analysis.

14. The computer system of claim 9, wherein said input content includes at least one of a bar chart, a table, a graph, or a plurality of images.

15. The computer system of claim 9, wherein said input content includes at least one of an author profile, a reader profile, a generation data or source of an object.

16. The computer system of claim 9, wherein a plurality of relationships is determined during said pattern analysis including at least one of a coordinate relationship, a sequence relationship, and a time relationship.

17. A computer program product for providing log management, comprising:

one or more non-transitory computer-readable storage medium and program instructions stored on at least one of the one or more non-transitory computer-readable storage medium, the program instructions executable by a processor to perform:

receiving a request from a user for retrieving a log record, said request having an input content;

determining any record of previous activity of the user and preferences and adjusting said input content based on a usage connotation determined by said previous activity of the user and preferences;

performing a similarity analysis of said adjusted input content and a plurality of log records in an object library, wherein said similarity analysis compares a plurality of attributes and patterns in said input content and said log records, and each attribute has a dimension with a predefined weight (W);

performing a fairness analysis when comparing said input content and said plurality of log records so as to ensure that one type of log is not to favored over another type of log; and determining a final log selection and providing it to said user, wherein said final log selection is the result of a best match between said input content and at least one record in said plurality of log records in said object library based on one or more similarities determined during said similarity analysis and said fairness analysis.

18. The computer program product of claim 17, wherein said final log selection is stored in said object library.

19. The computer program product of claim 17, wherein said similarity analysis and said fairness analysis is based on either or both text oriented and non-text oriented objects provided in said input content and said records in said object library.

20. The computer program product of claim 17, wherein said final log is segmented according to a plurality of granularities relevant to said user's usage.

* * * * *